(12) United States Patent
Giesen

(10) Patent No.: US 10,977,627 B2
(45) Date of Patent: *Apr. 13, 2021

(54) PROCESS FOR PERFORMING TRANSACTIONS

(71) Applicant: Heinz Giesen, Munster (DE)

(72) Inventor: Heinz Giesen, Munster (DE)

( * ) Notice: Subject to any disclaimer, the term of this patent is extended or adjusted under 35 U.S.C. 154(b) by 140 days.

This patent is subject to a terminal disclaimer.

(21) Appl. No.: 16/213,429

(22) Filed: Dec. 7, 2018

(65) Prior Publication Data

US 2019/0114601 A1  Apr. 18, 2019

Related U.S. Application Data

(63) Continuation of application No. 14/441,299, filed as application No. PCT/EP2013/071495 on Oct. 15, 2013, now Pat. No. 10,185,939.

(30) Foreign Application Priority Data

Nov. 14, 2012  (DE) ...................... 10 2012 220 774.0

(51) Int. Cl.
| | |
|---|---|
| *G06Q 20/00* | (2012.01) |
| *G06Q 20/10* | (2012.01) |
| *G09C 5/00* | (2006.01) |
| *H04L 9/06* | (2006.01) |
| *G06Q 30/06* | (2012.01) |
| *G06Q 40/02* | (2012.01) |
| *G06Q 20/38* | (2012.01) |

(52) U.S. Cl.
CPC ............. *G06Q 20/10* (2013.01); *G06Q 30/06* (2013.01); *G06Q 40/02* (2013.01); *G09C 5/00* (2013.01); *H04L 9/0656* (2013.01); *G06Q 20/38* (2013.01); *H04L 2209/56* (2013.01); *H04L 2209/88* (2013.01)

(58) Field of Classification Search
CPC ......... G06Q 20/10; G06Q 30/06; G06Q 40/02
USPC ................................................ 705/39
See application file for complete search history.

(56) References Cited

U.S. PATENT DOCUMENTS

| | | | | |
|---|---|---|---|---|
| 7,308,709 B1 * | 12/2007 | Brezak, Jr. | ......... | G06Q 20/3674 705/67 |
| 8,156,543 B2 * | 4/2012 | Wentker | .............. | H04L 63/0884 726/3 |

(Continued)

FOREIGN PATENT DOCUMENTS

| | | |
|---|---|---|
| EP | 1150227 A1 | 10/2001 |
| WO | WO-02/19211 A1 | 3/2002 |
| WO | WO-2004/036513 A1 | 4/2004 |

(Continued)

OTHER PUBLICATIONS

Indian Examination Report dated Apr. 29, 2020 for corresponding Indian Application No. 5098/DELNP/2015.

(Continued)

*Primary Examiner* — Edward Chang
(74) *Attorney, Agent, or Firm* — Harness, Dickey & Pierce, P.L.C.

(57) ABSTRACT

The disclosure relates to a process for performing transactions among a number of participants, in which every participant has a unique pseudonym assigned to him and the assignment of pseudonym to a participant and the participant's transaction data are stored on a notary server.

5 Claims, 6 Drawing Sheets

(56) References Cited

U.S. PATENT DOCUMENTS 9,317,850 B2 * 4/2016 Keresman .............. G06Q 20/26
2012/0089519 A1 4/2012 Peddada

FOREIGN PATENT DOCUMENTS

WO     WO-2008/108861 A1    9/2008
WO     WO-2012/125531 A1    9/2012

OTHER PUBLICATIONS

Canadian Office Action dated Apr. 30, 2019 for corresponding Canadian Application No. 2,892,738.
European Office Action dated Feb. 7, 2019 for corresponding European Application No. 17 174 258.8.
European Summons to Oral Proceedings dated Aug. 10, 2020 for corresponding European Application No. 17 174 258.8.
Canadian Office Action dated Jul. 7, 2020 for corresponding Canadian Application No. 2,892,738.

\* cited by examiner

PROCESS FOR PERFORMING TRANSACTIONS

PRIORITY CLAIM

This application is a continuation of U.S. application Ser. No. 14/441,299, filed on May 7, 2015, which is a National Stage entry of PCT/EP2013/071495, filed on Oct. 15, 2013, which claims the benefit of foreign priority in accordance with 35 U.S.C. 119(b) to German application No. 10 2012 220 774.0 filed Nov. 14, 2012, the entire contents of each of which is incorporated herein by reference.

BACKGROUND

The disclosure relates to a process for performing transactions among a number of participants.

Many processes for performing transactions, especially for the financial sector, are known from the prior art.

A frequent weak point of these processes is the manipulability of the transaction-limiting data, such as, for example, the bank information of senders and recipients of a transfer. This is especially problematic in the area of online banking, due to the accessibility of the transaction channel, for example, by man-in-the-middle attacks. To prevent these attacks, the use of unique transaction numbers (TAN process) was introduced; these numbers are known only to the person performing the transfer and the financial institution; and they must be sent along with every transaction request. The security of this process against manipulation was further improved by the iTAN or chipTAN schemes, among others; especially the chipTAN scheme is distinguished by discontinuity of media. Here discontinuity of media means that there is a transfer from one medium, for example the Internet, to another medium, for example optical reading of a picture. This reduces the susceptibility of the process to attack, since manipulating the process would require attacking both media.

Payment systems and corresponding processes, and systems for simplifying and authenticating transactions are disclosed in the documents WO 02/19211 A1, EP 1 150 227 A1, WO 2004/036513 A1, and US 2012/0089519 A1, for example.

BRIEF DESCRIPTION OF THE DRAWINGS

Embodiments of the disclosure are explained in detail below with reference to the drawings. The figures are as follows.

DESCRIPTION

Figure 1:
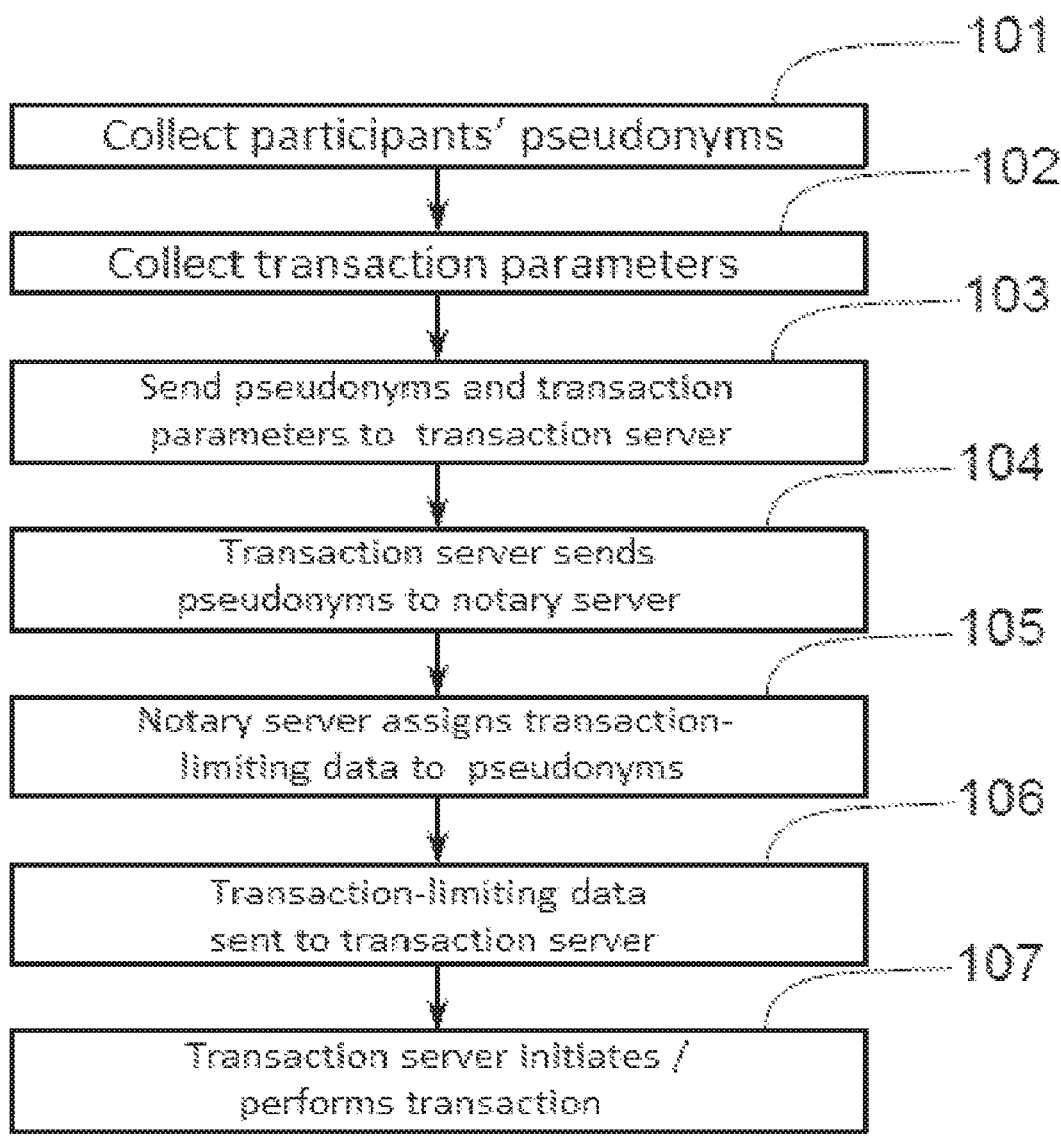
FIG. 1 shows a flow chart of a process in accordance with various embodiments disclosed herein.

By contrast, the disclosure has the goal of creating an improved process for performing transactions.

The goal of the disclosure is achieved by the features of claim 1. Embodiments of the disclosure are specified in the dependent claims.

One example embodiment of the disclosure creates a process for performing transactions among a number of participants. Each participant of the transaction is assigned a unique pseudonym. The assignment of the pseudonyms to each participant is stored on a notary server. The notary server also stores the participants' transaction data and uniquely assigns it to them. Carrying out the process also requires an application program and at least one transaction server.

Here transaction data means data that must be known to perform a transaction; otherwise this is impossible. In the case of making a transfer, the transaction data would be, for example, the participants' bank information; in the case of sending a message it would be e-mail addresses, for example. Many transactions have the same transaction data, so this transaction data can be referred to as master data.

A notary server, like a transaction server, is a server computer. The latter does not necessarily have to be a physical entity, but rather can also be completely virtual, for example in the form of a computing unit deployed in a computer network. Such a notary server is preferably designed in such a way that the data stored on it is protected from access by third parties, and is only supplied to a transaction server at the request of the transaction server.

The first block of the process comprises the application program collecting the pseudonym of a first participant. The pseudonym can be collected by manual input or by reading a data storage device, for example. Using a financial transaction as an example, the first participant would be the person making the transfer or the sender. The second block of the process comprises the application program collecting the pseudonyms of any number of other participants. It is preferable for these pseudonyms to be collected in a sensory manner, that is, for example, by reading a magnetic card or optically reading a barcode or QR code. Using a financial transaction as an example, the aforementioned other participants would be the recipients of a transfer. As soon as the application program has collected all participants involved in the transaction, the transaction parameters are sent to the application program. Using a financial transaction as an example once again, the transaction parameters would be the amount to be transferred or a purpose. Thus, transaction parameters can be different for every transaction, and can be called variable data.

After the participants' pseudonyms and transaction parameters have been collected by the application program, the entire transaction record, comprising precisely these pseudonyms and transaction parameters, is forwarded to at least one transaction server. This forwarding can be done over the Internet, for example, or any other communication channel. As soon as the transaction server receives a transaction record, it extracts from it the participants' pseudonyms and sends them to the notary server. Since the notary server stores the assignment of the pseudonyms to the corresponding participants, it is able to identify the participants on the basis of their pseudonyms. Therefore, the notary server is able to send the participants' transaction data to the transaction server. As soon as the transaction server has received the participants' transaction data, it can either perform or initiate the transaction.

The described embodiment is especially advantageous, since the transaction record contains only the participants' pseudonyms. Thus, it is impossible to manipulate the transaction data, such as, for example, bank information, in the transaction record, except by completely replacing the pseudonyms. However, this presumes that a potential attacker is also registered on the notary server. This makes it easy to identify an attacker. Only the transaction parameters can be manipulated, which, however, generally does not cause any harm, since the transaction participants notice this and can correct it. In the case of a financial transaction, for example, only the amount transferred between the participants could be changed. However, diversion of the payment to a different account would be impossible without revealing the identity of an attacker.

One example embodiment of the disclosure involves assigning a series of pieces of data to each of the participants' pseudonyms. To allow a transaction to be performed, the transaction data of each participant must first be stored. The notary server supplies this data to the transaction server on request, as previously described. In addition to this transaction data, other information is stored that uniquely identifies a participant. This could be, for example, name, address, birthplace and date of birth, an identification card number, or a combination of this data. The notary server also stores, for each participant, unique channel information that is suitable to specify a communication channel between the notary server and the application program. This could be, for example, the participant's e-mail address.

The previously mentioned data can be collected when a participant registers on the notary server, for example, by having the participant fill out a form with personal data. The entered data is then input into the notary server or read by it. This means that the participants' data is known only to the notary server and is protected from access by others. During the course of registration, the participant's identity can be further verified by checking an identification card, for example.

As was previously mentioned, a unique pseudonym is assigned to every participant. One example embodiment of the disclosure uses the encrypted record of a participant as the [participant's] pseudonym. The encryption key is stored only on the notary server, so that the pseudonym can only be decrypted by the notary server. This does not necessarily require storing the complete record of every participant on the notary server, only the assignment of pseudonyms and keys. This encryption can be done using any process. Furthermore, here it is possible to encrypt the record symmetrically using a one-time pad, so that decryption of the pseudonym without knowledge of the key can be excluded. Since the pseudonym is encrypted and decrypted by the same entity, the problems associated with communicating the key are eliminated.

One example embodiment of the disclosure uses the QR code of the previously described encrypted record of the participant as the participant's pseudonym. Using the pseudonym in the form of a QR code makes it easier to read the pseudonym later in the process, since a QR code can be optically read with little effort, for example by the camera of a smartphone or a tablet PC.

As was previously described, it is possible to manipulate the transaction parameters contained in a transaction record. However, one embodiment of the disclosure can prevent this by having the application software encrypt the transaction record before sending it to the transaction server. The transaction record is then decrypted by the transaction server. Suitable selection of the encryption process can tailor the security of the previously described process to the security requirements in each case.

One embodiment of the disclosure allows the encryption type and the key used to be individualized for every transaction type or even every transaction. The encryption processes used here can be symmetric, asymmetric, or even hybrid. It is also possible to encrypt only part of a transaction record. This makes it possible to protect critical transaction parameters such as, for example, the amount of a transfer or secret information, while uncritical transaction parameters such as, for example, an accompanying text, do not have to be encrypted.

One embodiment of the disclosure performs a transaction only when at least some of the participants of the transaction have been authenticated by the transaction server or the notary server. It is preferable for the participants to be authenticated only after a transaction record is received by a transaction server. The fact that the participants of the transaction have been authenticated by the transaction or notary server ensures that the participants' pseudonyms contained in the transaction record have not been replaced before the transaction is performed. Thus, in this embodiment, replacement of the pseudonyms would be recognized no later than when the participants are authenticated.

One example embodiment of the disclosure authenticates the participants using application programs registered to each participant and additionally using a time window of validity for a transaction record. In this embodiment it is preferable for each participant to have his own application program assigned to him, and for the assignment of application programs to the participants to be stored on the notary server. Now if a transaction record should be sent to a transaction server, a time window of validity is first defined for this transaction record. The transaction record is then processed by a transaction server only if the point in time of processing falls within the time window of validity. To accomplish this, the application program inserts a time stamp into the transaction record. This documents the point in time at which the transaction record was created.

Now if a transaction server receives a transaction record, it checks whether the current time is within the time window of validity, taking into consideration the time stamp of the transaction record. If this is the case, the participants' application program(s) ask for confirmation of the transaction request. This request can be sent either by the transaction server or by the notary server. A confirmation request can involve, for example, the transaction or notary server causing the participant's application program to open a popup window that informs the participant that a transaction request has been received. It is then possible to confirm or decline this transaction request. A transaction is performed only once all requested confirmations have been received.

If the point in time when a transaction record is processed is outside the time window of validity, the transaction server discards the transaction record. This prevents the transaction records being held back for later processing. Authentication of the participants also prevents a transaction being sent to the wrong recipient. For example, the sender can, for his part, wait with his confirmation of the transaction request until the recipients have received the request for confirmation. As soon as the recipients have received a request for confirmation, it is certain that the recipients' pseudonyms have not been manipulated.

In one exemplary embodiment of the disclosure, the application program that reads the pseudonyms and to which the transaction parameters are sent is registered to one of the participants. This means that his pseudonym is known to the application program, and need not be reread for every transaction request. If a transaction record is sent from this application program, the pseudonym of the participant to whom the application program was registered is automatically inserted into the transaction record. Furthermore, registration of the application program to the participant allows unique assignment of the application program to this participant by the notary server or also the transaction server. This allows transaction records that are sent from the registered application program to the transaction server to be uniquely assigned to a first participant. This excludes unnoticed manipulation of the pseudonym of the first participant. In the embodiment described below, the registration of an application program to a participant can also contain an assignment of the application program to a piece of terminal equipment. This can prevent the application program being extracted from the participant's piece of terminal equipment and being used on another piece of terminal equipment against the will of the participant.

In one embodiment of the disclosure, registration of an application program to a participant comprises the following blocks:

First, the application program reads the pseudonym of the participant to whom the application program should be registered in a sensory manner. This can alternatively be done during installation of the application program or afterwards. Then, the application program determines a parameter that uniquely identifies the piece of terminal equipment on which the application program is installed. For example, this can be the Globally Unique Identifier (GUID) of the piece of terminal equipment, which is usually stored in the hardware of the piece of terminal equipment. Then, the application program sends the pseudonym of the participant to whom the application program should be registered and the uniquely identifying parameter of the piece of terminal equipment to the notary server. However, before this data is stored on the notary server, it must first be verified that the participant who wants to register the application software installation to a pseudonym also really is the participant who is assigned this pseudonym on the notary server. To accomplish this, a piece of participant information that can be uniquely assigned to the participant by the notary server is sent to the notary server in addition to the already mentioned data. This can be, for example, a security question, a piece of personal information contained in the participant's record, or also an arbitrary number that was generated when the participant logged on to the notary server and is known only to the participant and the notary server. When the notary server receives a registration request, it checks whether the participant information sent is contained in the record of the participant to whom the pseudonym is assigned. If this is the case, information about the piece of terminal equipment on which an application program installation was registered is additionally added to the participant's record.

One example embodiment of the disclosure presents a system comprising at least one transaction server and one notary server. In this embodiment, a transaction server is adapted to read transaction records comprising transaction parameters and participants' pseudonyms, and to perform and/or initiate a corresponding transaction. The notary server contains records of the participants of the process; these records comprise the following information: the pseudonym of a participant; data uniquely identifying the participant; transaction data of the participant; and the notary server supplies the transaction-relevant data belonging to a pseudonym contained in the transaction record to the transaction server at its request.

In one example embodiment of the disclosure, the previously described system also comprises a piece of terminal equipment of a participant, the participant's piece of terminal equipment having an application program installed on it that allows the previously described process to be performed.

In one example embodiment of the disclosure, the notary server of the previously described system is adapted to assign the piece of terminal equipment on which the application program is installed to a unique participant.

One example embodiment of the disclosure presents a computer program product that is adapted to perform the previously described process blocks.

In the following discussion of the embodiments, elements that correspond to one another or are identical are labeled with the same reference numbers.

FIG. 1 shows a flow chart of an inventive embodiment of the process. Feasibility of the process presumes at least the presence of a transaction server, a notary server, a number of participants, and an application program. The process involves assigning a unique pseudonym to every participant, this assignment of pseudonyms to the participants being stored on the notary server. The notary server also assigns the participants' transaction data to the participants. A participant's transaction data can be, for example, his bank information, or similar information.

A first block 101 involves reading the pseudonyms of the participants involved in the transaction. This reading of the pseudonyms is done by the application program, for example by reading a storage location where the pseudonyms are stored, or by optical reading of a barcode containing the pseudonyms. After the participants' pseudonyms have been read, the application program collects the transaction parameters 102. The transaction parameters can be, for example, an amount of money to be transferred or a message to be sent between two participants.

The combination of pseudonym and transaction parameters represents a transaction record. In the next block 103, the application program sends this transaction record to a transaction server. However, the transaction server cannot assign the pseudonyms to the participants. Therefore, in a fourth block 104 the transaction server sends the pseudonyms contained in the transaction record to the notary server. The notary server in turn is able, on the basis of the assignment of participants and pseudonyms stored on it, to assign the pseudonyms that were sent from the transaction server to the corresponding participants 105. Since the notary server also stores transaction data for every participant, it can send it to the transaction server 106, so that the latter can initiate or perform a transaction in accordance with the previously received transaction record 107.

Figure 2:
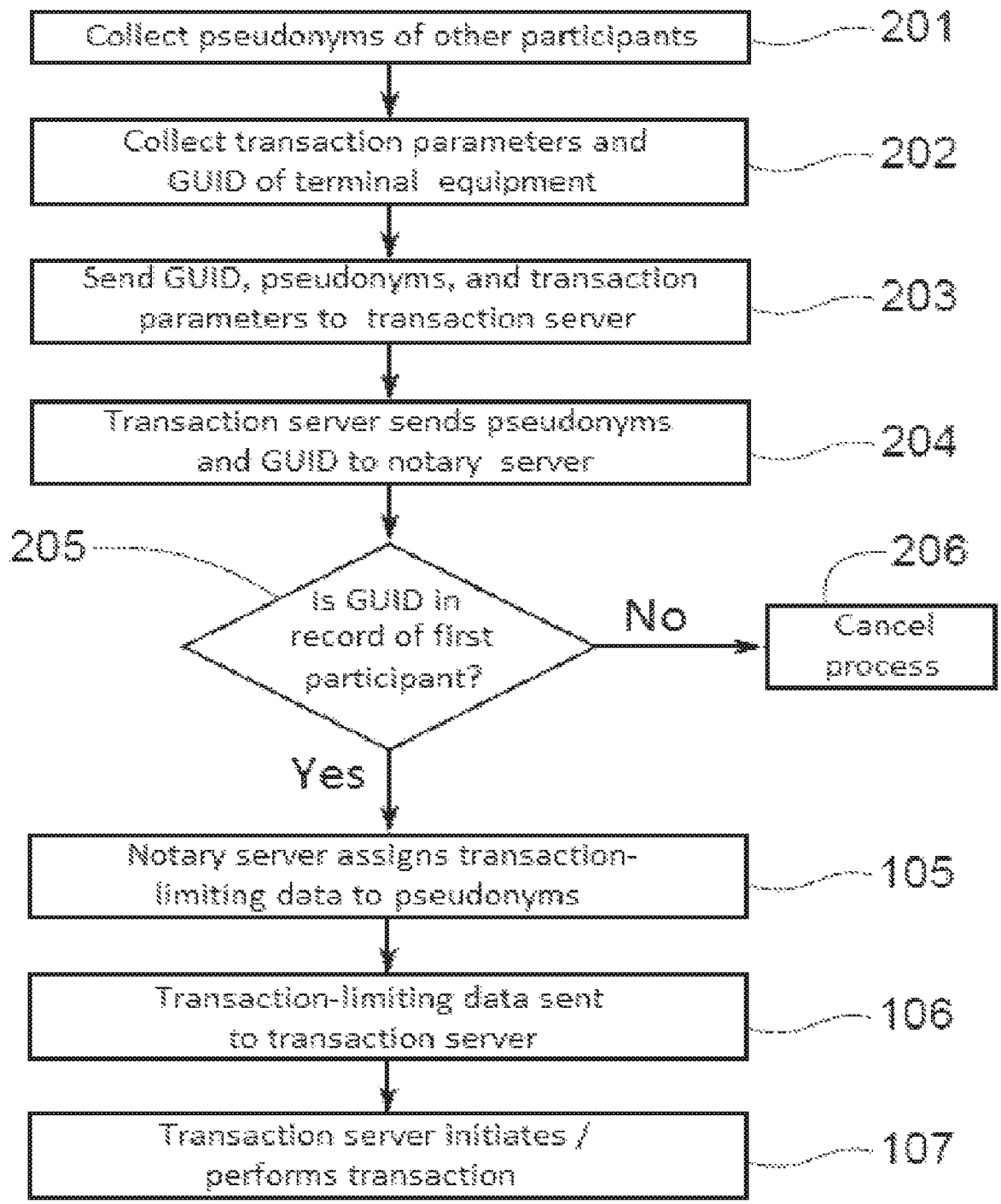
FIG. 2 shows a flow chart of a process with a registered application program in accordance with various embodiments disclosed herein.

FIG. 2 shows a flow chart of an embodiment of the inventive process in which the process is expanded by registration of the application program sending the transaction record to a participant. This involves assigning, during the program's registration, the Globally Unique Identifier (GUID) of the piece of terminal equipment on which the application program was installed, to the notary server's record of the participant registering the application program.

Since the application program is registered to one of the participants, his pseudonym is known to the application program. Therefore, in the first block 201 the application program only collects the pseudonyms of the other participants. The pseudonym of the first participant that registered the application program is added to the record by the application program. In the second block 202, the application program collects the Globally Unique Identifier (GUID) of the piece of terminal equipment in addition to the transaction parameters. In the third block 203, the application program sends, to the transaction server, the transaction record, which has been expanded over [that in] the embodiment shown in FIG. 1 by the addition of the GUID of the piece of terminal equipment used.

Analogous to the previously described process, the transaction server extracts the participants' pseudonyms from the transaction record and sends them to the notary server. In addition to the pseudonyms, the GUID, which is contained in the transaction record, is also forwarded to the notary server. The notary server now checks whether received GUID is contained in the record of the first participant 205. If this is not the case, the process is canceled 206. However, if the assignment of the GLAD does coincide with the pseudonym of the participant, then process blocks 105-107 are performed, analogous to the process shown in FIG. 1.

The use of a registered application program prevents unnoticed manipulation of the first participant's pseudonym. As soon as the pseudonym of the first participant has been manipulated, the assignment of the pseudonym to the GUID that is sent does not coincide with the information of the notary server, so that the process is immediately canceled.

Figure 3:
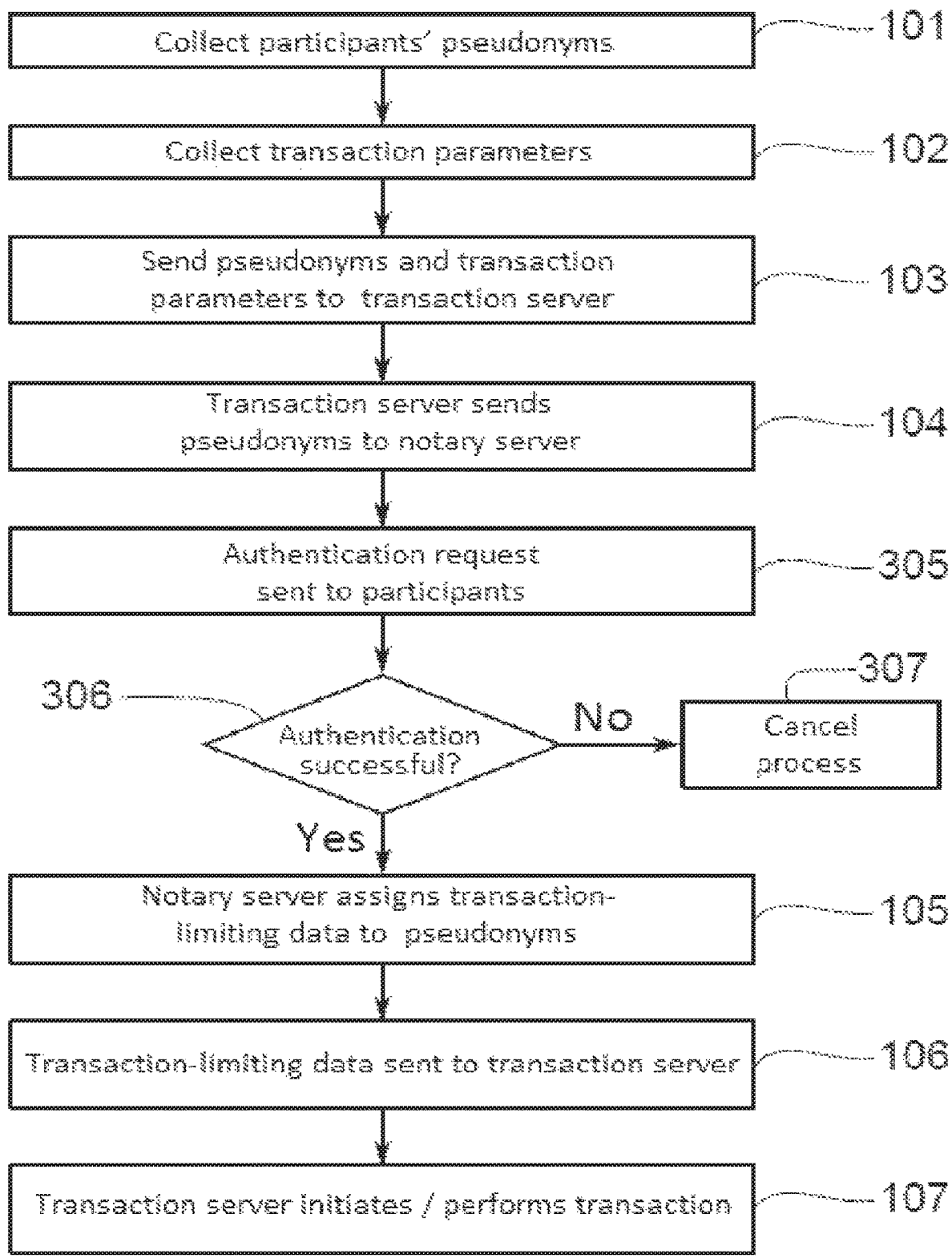
FIG. 3 shows a flow chart of a process with the additional block of participant authentication in accordance with various embodiments disclosed herein.

FIG. 3 shows a flow chart of an embodiment of the inventive process in which the process is expanded by authentication of the participants. The authentication presumes that the participants of the process have an application program that is registered to them.

Process blocks 101-104 run identically to those in FIG. 1. After the notary server has received the pseudonyms contained in the transaction record from the transaction server, an authentication request is sent to the participants 305. Here it is necessary for every participant to have a registered application program. Moreover, the notary server must be able to communicate with the participants' application programs. For the purpose of authentication, it is possible to send, to the participants' application program, a request that must be manually confirmed by the participants, for example. For example, this request can contain information about [the participants] between whom a transaction should be performed and what transaction parameters have been sent.

If even one participant does not confirm the authentication request 306, the process is canceled 307. However, if all participants confirm the authentication request, the process is continued according to the previously described blocks 105-107.

The additional block of requesting authentication allows, for example, a first participant who wants to perform a transaction to the other participants, to wait to confirm his authentication request until he knows that all other participants have also confirmed the authentication request. This can be realized, for example, by the first participant calling the other participants and asking whether an authentication request corresponding to the provided transaction has been received. As soon as this is the case, it is impossible for the transaction that should be performed to be diverted to other persons.

Figure 4:
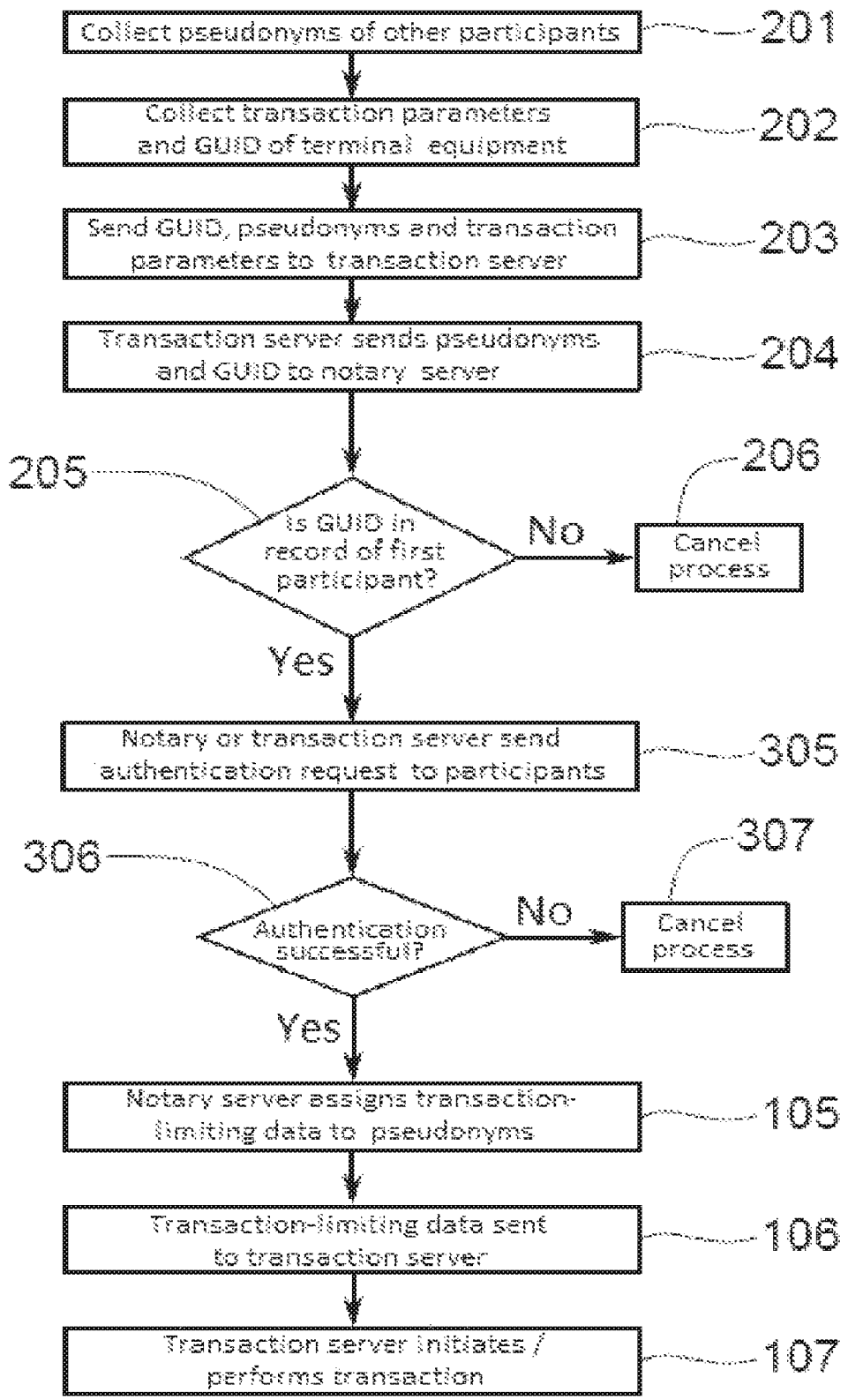
FIG. 4 shows a flow chart of a process with registered program and the participant authentication block in accordance with various embodiments disclosed herein.

FIG. 4 shows a flow chart of an embodiment of the inventive process in which the process is expanded by the additional blocks of registration of an application program and the request for authentication.

Process blocks 201-204 are analogous to those in FIG. 2. As soon as the GUID contained in the transaction record can be uniquely assigned to the pseudonym of the first participant, the notary or transaction server sends an authentication request to the other participants 305. Only after the other participants have been successfully authenticated are process blocks 105-107 performed as described in FIG. 1. It is also possible for the order of security requests 204 and 305 to be switched. The characteristic feature of this embodiment of the process is that the identity of the first participant is established on the basis of the registration, while the identity of the other participants is established on the basis of the authentication request. This prevents unnoticed manipulation of pseudonyms of the participants of the transaction.

FIGS. 1-4 omit the encryption of a transaction record by the application program and the subsequent decryption by the transaction server, to make these figures easier to read.

Figure 5:
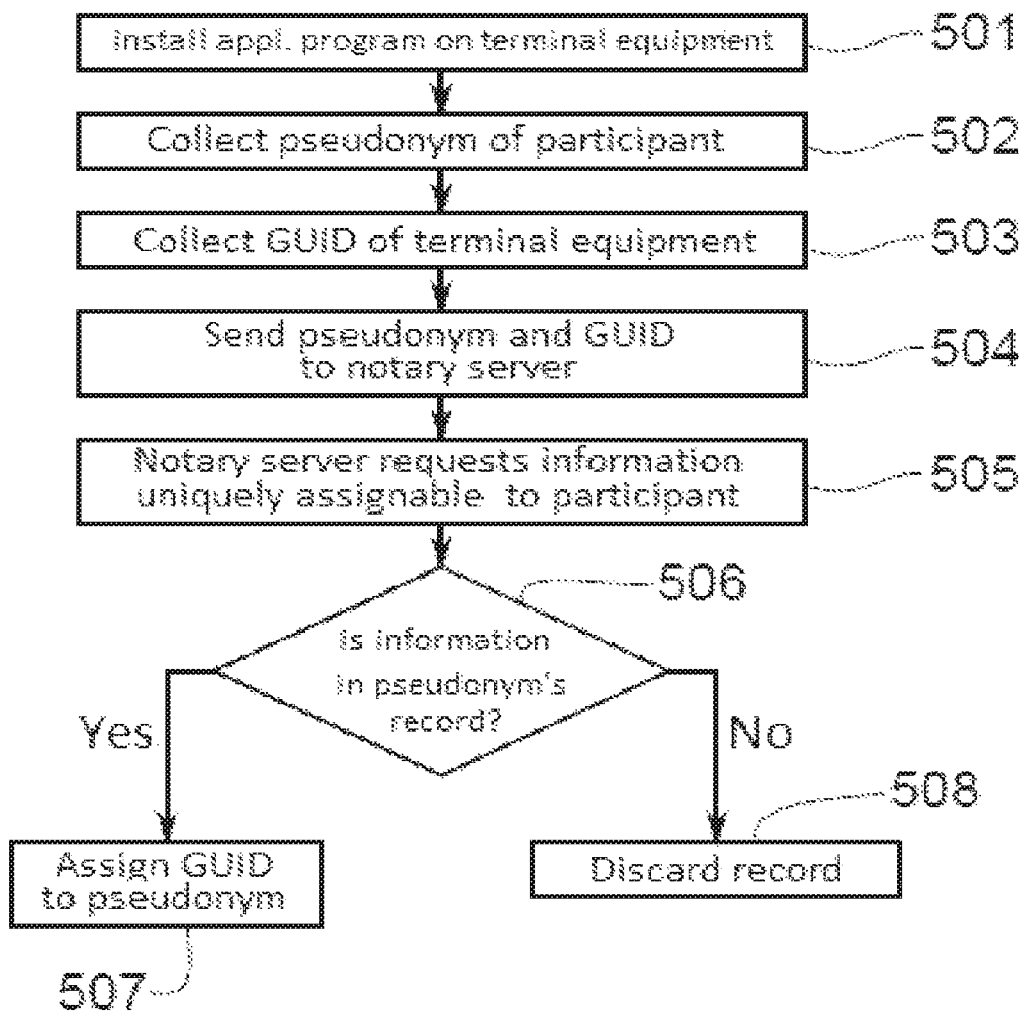
FIG. 5 shows a flow chart of a process for registration of an application program to a participant in accordance with various embodiments disclosed herein.

FIG. 5 is a flow chart of an inventive process for registration of an application program to a participant.

The first block 501 is installation of the application program on a piece of terminal equipment. This piece of terminal equipment can be, for example, a smartphone, a personal computer, a tablet PC, or something similar. The second block 502 is for the application program to collect pseudonym of the participant that would like to register it. The pseudonym can be collected either while the application program is still being installed or afterwards. The pseudonym itself can be collected, for example, by reading it in from a barcode or reading it out of a storage medium. After the application program collects the participant's pseudonym, it stores it. Then, the application program collects the Globally Unique Identifier of the piece of terminal equipment 503. This identifier is usually stored in the hardware of the piece of terminal equipment. After the pseudonym and GUID have been collected, they are sent to the notary server 504. After the notary server receives the pseudonym and GUID, it identifies the participant on the basis of his pseudonym and asks the participant for additional participant information; this query is done over a communication channel specified by channel information at log-on 504. The corresponding communication channel can be defined by an e-mail address, for example.

The participant information can be, for example, the participant's date of birth, address, identification card number, or something similar. Here it is necessary for the participant information to be stored in the participant's record on the notary server at the beginning, when the participant logs on, and that the notary server can assign it to the participant. After the notary server receives the participant information, it checks whether the participant information sent is contained in the record assigned to the pseudonym on the notary server 506. If this is the case, the GUID of the piece of terminal equipment on which the application program was installed is assigned to the record of the pseudonym 507. However, if the participant information is not contained in the record of the pseudonym, the record is discarded and the registration is canceled 508.

Registration of the application program to a participant enables the notary server to send an authentication request to this application program. In the above embodiments this contributes to the security of the process. Registration of the application program also increases the system's user-friendliness, since the pseudonym of the participant to whom the application program is registered does not have to be read in again for every transaction, but rather is automatically added to the transaction record by the application program.

Figure 6:
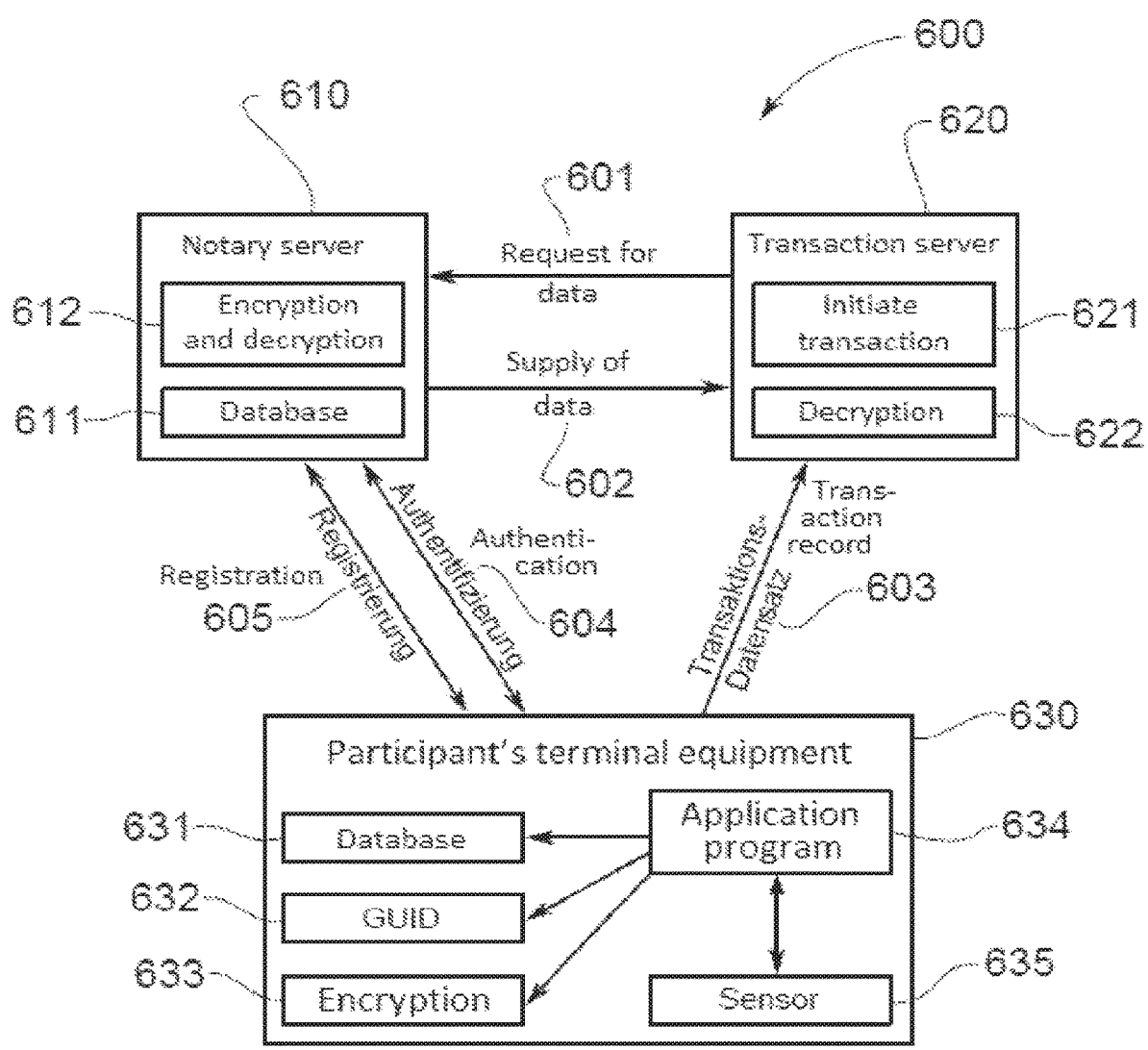
FIG. 6 shows a block diagram of a system allowing performance of a process in accordance with various embodiments disclosed herein.

FIG. 6 shows a system 600 that allows the performance of a process in accordance with one example embodiment of the disclosure. The essential requirements for performing this process are a notary server 610, a transaction server 620, and the piece of terminal equipment of a participant 630.

The notary server 610 contains a database 611 that stores at least the assignment of pseudonyms to participants and the participants' transaction data. In the case when the pseudonym of a participant is his encrypted record, in accordance with the above embodiment, the notary server also contains means to encrypt and decrypt 612 participants' records. This can be, for example, a processor with an assigned data storage device containing a program code that can be executed by the processor and that contains instructions that can be executed by the computer, these instructions being tailored to encrypt and decrypt a record in accordance with a certain encryption process.

The transaction server 620 contains means to initiate a transaction 621, which in the case of a financial transaction, for example, can be a communications connection with a bank. For the case in which the transaction records are encrypted by the application program to increase the security of the process, the transaction server 620 also contains means to decrypt 622 the transaction records, which can be done analogous to 612.

A participant's piece of terminal equipment 630 contains a database 631 that stores the participant's pseudonym after an application program has been registered, for example. The participant's piece of terminal equipment 630 also contains a sequence of numbers or characters uniquely identifying the piece of terminal equipment 632, for example its GUID. In the case when transaction records are supposed to be sent to the transaction server in encrypted form, a participant's piece of terminal equipment 630 also contains means of record encryption 633 that can be executed in an analogous manner to 612. The piece of terminal equipment 630 also contains the application program 634, which is necessary to perform the transactions. This program is able to access the GUID 632, the database 631, and the means of encryption 633. The piece of terminal equipment 630 also contains a sensor 635, which can read participants' pseudonyms. This sensor is coupled to the application program in such a way that they can operate together and the application program can receive information from the sensor.

The piece of terminal equipment 630 and the notary server 610 have communication channels between them that can be used to authenticate a participant 604 and to register an application program to a participant 605. The piece of terminal equipment 630 and the transaction server 620 also have a communication channel between them over which transaction records 603 are sent from the piece of terminal equipment to the transaction server. Since at first the transaction server 620 cannot process pseudonyms, the transaction server 620 and the notary server 610 also have a communications link between them, over which the transaction server 620 can request participants' data 601, following which the notary server 610 can supply the corresponding data 602 to the transaction server 620.

The process described in FIG. 4 is explained below on the basis of system 600. It will be assumed that the application program is registered to one of the participants. To make things easier to understand, only one transaction server will be used here. Furthermore, the figure also shows only one piece of participant terminal equipment, which should be considered to represent many pieces of participant terminal equipment.

First, the pseudonyms of the participants of the transaction are collected by sensor 635 and forwarded to the application program 634. In addition, the transaction parameters are collected by the application program 634 and the GUID 632 of the piece of terminal equipment 630 is collected. The first participant's pseudonym contained in the database 631 is also read out by the application program 634 and added to the transaction record. The record produced in this way, which comprises the pseudonym of the first participant, the pseudonyms of the other participants, the GUID of the piece of terminal equipment, and the transaction parameters, is now encrypted 633. The encrypted transaction record is now sent over communication channel 603 to transaction server 620. The latter decrypts 622 the transaction record. Then, the transaction server extracts, from the transaction record, the pseudonyms of the participants and the GUID of the piece of terminal equipment on which the transaction record was created. Now, the transaction server 620 requests 601 the transaction data belonging to the pseudonyms on the notary server 610. In addition, the previously extracted GUID is also sent to the notary server. The notary server 610 now checks whether the GUID received is stored in the record of the first participant. If this is not the case, the process is canceled, since it must be assumed from this that the application program is being used against the will of the first participant, for example, due to extraction of the application program from the first participant's piece of terminal equipment. However, if the received GUID coincides with the GUID contained in the record of the first participant, an authentication request 604 is sent to the other participants' pieces of terminal equipment 630. If the authentication request is not confirmed by even one participant, then the process is canceled, since it must be assumed from this that the pseudonym of a participant has been manipulated. However, if the authentication request is confirmed by all participants, the notary server assigns to the pseudonyms the corresponding participants with the respective transaction data and sends the participants' transaction data 602 to the transaction server 620. The transaction server now performs the transaction 621, or initiates it, using the previously received transaction parameters.

Some aspects and features of the disclosed embodiments are set out in the following numbered items:

1. Process for performing transactions among a number of participants, in which every participant has a unique pseudonym assigned to him and the assignment of a pseudonym to a participant and the participant's transaction data are stored on a notary server (610) in a process comprising the following steps:

providing an application program (634) and at least one transaction server (620); collecting the pseudonym of a first participant by the application program (634); sensory collection of the pseudonym of a second participant by the application program (634); sending of transaction parameters to the application program (634); sending (603) pseudonyms and transaction parameter from the application program (634) to a transaction server (620); sending (601) the pseudonyms from the at least one transaction server (620) to the notary server (610); identification of the participants by the notary server on the basis of the pseudonyms (610); sending (602) the participant transaction data to the at least one transaction server (620) by the notary server (610); and, performance, by the at least one transaction server (620), of the transaction between the first participant and the at least one other participant using the transaction parameters.

2. The process described in item 1, in which a participant's transaction data is transaction-limiting data, without knowledge of which a transaction cannot be performed and which remains the same for every transaction of the participant, and in which transaction parameters are data that can be different for every transaction of the participant and are not transaction-limiting.

3. The process described in one of the preceding items, in which the following data is assigned to the pseudonym of the first and/or second participant:

information uniquely identifying the participant; channel information uniquely assigned to the participant specifying a communication channel between the notary server (610) and the application program (634); the participant's transaction data; and, the data being stored on the notary server (610) with the assigned pseudonym.

4. The process described in one of the preceding items, in which a participant's pseudonym is the encrypted record of the participant, the key to decrypting the record being stored on the notary server (610).

5. The process described in one of the preceding items, in which the pseudonym of a participant is the QR code of the encrypted record of the participant, the pseudonym being collected by optical reading of the QR code.

6. The process described in one of the preceding items, in which at least part of the transaction record (603) comprising the pseudonyms of the participants and the transaction parameters, is encrypted by the application program (634) before being sent from the application program (634) to the at least one transaction server (620), and is decrypted again by the at least one transaction server (620) after the transaction record (603) is received.

7. The process described in item 6, in which every type of transaction and/or every transaction itself is assigned an encryption method and/or key used for encryption of the transaction record (603).

8. The process described in one of the preceding items, in which a transaction is only performed if the at least one other participant and/or all other participants involved have been authenticated (604) by a transaction server (620) and/or a notary server (610) after a transaction server (620) receives a transaction record (603).

9. The process described in item 8, in which every participant has at least one application program (634) that is registered to the respective participant, the authentication (604) of the at least one other participant comprising the following steps: establishment of a time window of validity for a transaction record (603); insertion of a time stamp into the transaction record (603) by the application program (634), checking, by the transaction server (620), whether the receipt and/or processing of the transaction record (603) by the transaction server (620) falls within the time window of validity of the transaction record (603); if this is the case: requesting confirmation of the transaction request through the application program (634) of the at least one other participant; if this is not the case: discarding the transaction record (603).

10. The process described in one of the preceding items, in which the application program (634) that collects the pseudonyms and to which the transaction parameters are sent is registered (605) to one of the participants, so that his pseudonym is known to the application program (634) and transaction records (603) that are sent from this application program (634) can be uniquely assigned to this participant by the notary server (610) and/or the transaction server (620).

11. The process described in item 9 or 10, in which the registration (605) of the application program (634) to a participant comprises the following steps: sensory collection of the participant's pseudonym by the application program (634); determination of a parameter (632) uniquely identifying the piece of terminal equipment (630) on which the application program (634) is installed; sending the participant's pseudonym and the parameter (632) uniquely identifying the piece of terminal equipment (630) to the notary server (610); sending to the notary server (610) a piece of participant information that can be uniquely assigned to the participant by the notary server (610); and, checking, by the notary server (610), whether the information that can be assigned to the participant is contained in the record to which the participant's pseudonym is assigned.

12. System comprising at least one transaction server (620) and one notary server (610), in which a transaction server (620) can read transaction records (603) comprising the transaction parameters and participant pseudonyms, and perform and/or initiate a corresponding transaction, and in which the notary server (610) contains records of the participants of the process, the records comprising: the pseudonym of a participant; data uniquely identifying the participant; transaction data of the participant; and, the notary server (610) supplying the transaction-relevant data belonging to a pseudonym contained in the transaction record (603) to the transaction server (620) at its request.

13. The system described in item 12 also comprising a participant's piece of terminal equipment (630) having an application program (634) installed on it that allows the previously described process to be performed.

14. The system described in item 13 in which the notary server (610) can uniquely assign the piece of terminal equipment (630) on which the application program (634) is installed to a participant.

15. Computer program product that is adapted to perform the previously described process steps.

16. A process for performing transactions among a number of participants, in which every participant has a unique pseudonym assigned to him, in which a participant's pseudonym comprises his encrypted transaction data, a participant's transaction data being transaction-limiting data, without knowledge of which a transaction cannot be performed and which remains the same for every transaction of the participant, in which the assignment of a pseudonym to a participant, and the key required to decrypt the transaction data are stored in the form of a participant record on a notary server (610), the process comprising supplying an application program (634) installed on a piece of terminal equipment (630) of a first participant and at least one transaction server (620), the application program (634) being registered to the first participant (605), so that his pseudonym is known to the application program (634), a parameter (632) uniquely identifying the first participant's piece of terminal equipment (630) being contained in the first participant's record, the application program being able to determine the parameter (632) uniquely identifying the first participant's piece of terminal equipment (630), the process comprising the following steps: optical reading, by the application program (634), of a QR code containing the pseudonym of a second participant; collection of transaction parameters by the application program (634); sending (603) the pseudonyms of the first and second participant, the transaction parameters, and the parameter (632) uniquely identifying the piece of terminal equipment (630) from the application program (634) to a transaction server (620) over the Internet; sending (601) the pseudonyms and the parameter (632) uniquely identifying the piece of terminal equipment (630) from the at least one transaction server (620) to the notary server (610); identification of the participants by the notary server on the basis of the pseudonyms (610); checking whether the parameter (632) uniquely identifying the piece of terminal equipment (630) is contained in the first participant's record; if the parameter (632) uniquely identifying the piece of terminal equipment (630) is contained in the first participant's record, decryption of the transaction contained in the participants' pseudonym; sending (602) the participants' transaction data to the at least one transaction server (620) by the notary server (610); performance, by the at least one transaction server (620), of the transaction between the first participant and the at least one other participant on the basis of the transaction parameters.

17. The process described in item 1, in which transaction parameters are data that can be different for every transaction of the participant and are not transaction-limiting.

18. The process described in one of the preceding items, in which the parameter uniquely identifying the piece of terminal equipment is a parameter that is stored in the hardware of the piece of terminal equipment.

19. The process described in one of the preceding items, in which the following data is assigned to the pseudonym of the first and/or second participant: information uniquely identifying the participant; channel information uniquely assigned to the participant to specify a communication channel between the notary server (610) and the application program (634); the participant's transaction data; the data being stored on the notary server (610) with the assigned pseudonym.

20. The process described in one of the preceding items, in which at least part of the transaction record (603) comprising the pseudonyms of the participants and the transaction parameters, is encrypted by the application program (634) before being sent from the application program (634) to the at least one transaction server (620), and is decrypted again by the at least one transaction server (620) after the transaction record (603) is received.

21. The process described in item 20, in which every type of transaction and/or every transaction itself is assigned an encryption method and/or key used for encryption of the transaction record (603).

22. The process described in one of the preceding items, in which a transaction is only performed if the at least one other participant and/or all other participants involved have been authenticated (604) by a transaction server (620) and/or a notary server (610) after a transaction server (620) receives a transaction record (603).

23. The process described in item 22, in which every participant has at least one application program (634) that is registered to the respective participant, the authentication (604) of the at least one other participant comprising the following steps: establishment of a time window of validity for a transaction record (603); insertion of a time stamp into the transaction record (603) by the application program (634); checking, by the transaction server (620), whether the receipt and/or processing of the transaction record (603) by the transaction server (620) falls within the time window of validity of the transaction record (603); if this is the case: requesting confirmation of the transaction request through the application program (634) of the at least one other participant; if this is not the case: discarding the transaction record (603).

24. The process described in one of the preceding items, in which the registration (605) of the application program (634) to a participant comprises the following steps: sensory collection of the participant's pseudonym by the application program (634); determination of a parameter (632) uniquely identifying the piece of terminal equipment (630) on which the application program (634) is installed; sending the participant's pseudonym and the parameter (632) uniquely identifying the piece of terminal equipment (630) to the notary server (610); sending to the notary server (610) a piece of participant information that can be uniquely assigned to the participant by the notary server (610); checking, by the notary server (610), whether the information that can be assigned to the participant is contained in the record to which the participant's pseudonym is assigned.

25. A system comprising at least one transaction server (620) and one notary server (610), in which a transaction server (620) can read transaction records (603) comprising the transaction parameters and participant pseudonyms, and perform and/or initiate a corresponding transaction, and in which the notary server (610) contains records of the participants of the process, the records comprising: the pseudonym of a participant; data uniquely identifying the participant; transaction data of the participant; the notary server (610) supplying the transaction-relevant data belonging to a pseudonym contained in the transaction record (603) to the transaction server (620), at its request.

26. The system described in item 25 also comprising a participant's piece of terminal equipment (630) having an application program (634) installed on it that allows the previously described process to be performed.

27. The system described in claim 26 in which the notary server (610) can uniquely assign the piece of terminal equipment (630) on which the application program (634) is installed to a participant.

28. A computer program product that is adapted to perform the previously described process steps of one or more of items 16-24.

LIST OF REFERENCE NUMBERS

601 Request for data
602 Supply of data
603 Sending of a transaction record
604 Authentication
605 Registration
610 Notary server
611 Database
612 Encryption and decryption
620 Transaction server
621 Initiation of a transaction
622 Decryption
630 Piece of terminal equipment of a participant
631 Database
632 GUID
633 Encryption
634 Application program
635 Sensor

What is claimed is:

1. A system comprising:
at least one transaction server;
a piece of terminal equipment associated with a first participant; and
a notary server,
in which a transaction server of the at least one transaction server is configured to receive encrypted transaction records comprising transaction parameters and participant pseudonyms, decrypt the transaction records, and perform or initiate a transaction related to the transaction parameters and the participant pseudonyms, and
in which the notary sewer is configured to encrypt and store records of a plurality of participants, the plurality of participants including the first participant and a second participant the records comprising, a pseudonym of the first participant of the plurality of participants, data uniquely identifying the first participant, and transaction data of the first participant, the transaction data including unique information corresponding to the participant and required for processing a transaction related to the first participant, wherein the notary server is configured to decrypt and transmit the stored transaction data belonging to a pseudonym associated with the first participant contained in the transaction record to the transaction server; in response to a request of the transaction server in response to the notary server determining that the data uniquely identifying the first participant is contained in the first participant's stored record, and in response to the notary server determining that the data uniquely identifying the first participant is not contained in the first participant's stored record, the notary server is configured to not decrypt and not transmit the stored transaction data belonging to the pseudonym associated with the first participant; and wherein the first participant's piece of terminal equipment includes an application program, the application program being registered to the first participant, so that the first participant's pseudonym is known to the application program, and the application program is configured to,
  determine a parameter uniquely identifying the first participant's piece of terminal equipment,
  optically mad a QR code containing the pseudonym of a second participant,
  collect transaction parameters related to a first transaction between at least the first participant and the second participant, and
  send the pseudonyms of the first and second participant, the transaction parameters, and the parameter uniquely identifying the piece of terminal equipment to the transaction server over the Internet.

2. The system of claim 1, wherein the notary server is configured to uniquely assign the first participants piece of terminal equipment, on which the application program is installed, to a participant.

3. A method for identifying participants in a computer network for initiating transactions between participants, comprising:

assigning unique pseudonyms to a plurality of participants, the plurality of participants including at least a first participant and a second participant;

encrypting, by a notary server, transaction data of each of the plurality of participants, the transaction data including unique information corresponding to the participant and required for processing a transaction related to the participant;

storing the assigned unique pseudonyms and associated encrypted transaction data on the notary server of the computer network;

determining, by an application program executed on a piece of terminal equipment of the first participant of the plurality of participants, the application program registered to the first participant so that the first participant's unique pseudonym is known to the application program, a parameter uniquely identifying the piece of terminal equipment of the first participant;

optically reading by the application program, a QR code containing the pseudonym of the second participant, collecting, by the application program, transaction parameters related to a first transaction between at least the first participant and the second participant;

generating, by the application program, an encrypted transaction record, the encrypted transaction record including, the pseudonyms of the first and second participants, the transaction parameters, and the parameter uniquely identifying the first participants piece of terminal equipment to a transaction server ever the Internet;

sending the encrypted transaction record from the application program to a transaction server over the computer network;

decrypting, by tire transaction server, the encrypted transaction record received from the application program;

sending the unique pseudonyms of the first and second participants from the transaction server to the notary server;

identifying the first and second participants by the notary server on the basis of the pseudonyms of the first and second participants;

checking whether a parameter uniquely identifying the piece of terminal equipment of tire first participant is associated with the first participant on the notary server;

in response to results of the checking indicating the parameter uniquely identifying tee piece of terminal equipment is associated with the first participant, retrieving and decrypting tee transaction date of the first and second participants on the basis of tee unique pseudonyms;

sending the decrypted transaction data of the first and second participants from tee notary server to the transaction server; and the transaction server configured to at least initiate tee first transaction between the first participant and tee second participant on the basis of the decrypted transaction data of the first participant and the second participant and the transaction parameters, wherein in response to the results of the checking indicating that the parameter uniquely identifying the piece of terminal equipment is not associated with the first participant, the first transection is not performed by the transaction server.

4. The method of claim 3, wherein the unique pseudonyms comprise the encrypted transaction data and wherein a key for decrypting the transaction data is stored on the notary server.

5. A method for performing a transaction among a plurality of participants, the plurality of participants including at least a first participant and a second participant, a unique pseudonym being assigned to each of the participants, the assignment of pseudonyms and participants as well as corresponding transactional data of foe participants being encrypted by and stored on a notary server, the method comprising:

providing an application program and at least one transaction server, the application program registered to the first participant;

determining the pseudonym of the first participant of the plurality of participants by the application program;

determining a parameter uniquely identifying a piece of terminal equipment of the first participant by foe application program;

determining foe pseudonym of the second participant of the plurality of participants by the application program using a sensor by optically reading a QR code containing the pseudonym of the second participant;

transmitting transactional parameters related to a first transaction between at least the first participant and foe second participant to the application program;

transmitting, by the application program, the pseudonyms of the first and second participants, the transactional parameters, and the parameter uniquely identifying the piece of terminal equipment to the transactional server;

transmitting by the transactional server the pseudonyms of the fast and second participants to the notary server;

identifying, by the notary server, the first and second participants using the pseudonyms;

checking whether the parameter uniquely identifying the piece of terminal equipment associated with the first participant is stored on the notary server;

in response to result of the checking indicating the parameter uniquely identifying the piece of terminal equipment associated with file first participant is stored on the notary server, decrypting, by the notary server, encrypted transactional data of the participants, the transactional data including unique information corresponding to the participants and required for processing a transaction related to the participants;

transmitting, by the notary server, the decrypted transactional data of the first and second participants to the at least one transaction server, and performing, by the at least one transaction server, the first transaction between the first participant mid the second participant using the transactional parameters and the decrypted transactional data of the first and second participants, wherein in response to the results of the checking indicating that the parameter uniquely identifying the piece of terminal equipment associated with the first participant is not stored on the notary server, the first transaction is not performed.

\* \* \* \* \*